(12) United States Patent
Murakami

(10) Patent No.: US 11,433,937 B2
(45) Date of Patent: Sep. 6, 2022

(54) VEHICLE AND STEERING UNIT

(71) Applicant: KYOCERA Corporation, Kyoto (JP)

(72) Inventor: Kazuhiro Murakami, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/516,257

(22) PCT Filed: Oct. 3, 2014

(86) PCT No.: PCT/JP2014/005067
§ 371 (c)(1),
(2) Date: Mar. 31, 2017

(87) PCT Pub. No.: WO2016/051440
PCT Pub. Date: Apr. 7, 2016

(65) Prior Publication Data
US 2017/0297603 A1    Oct. 19, 2017

(51) Int. Cl.
*B62D 1/04*    (2006.01)
*B60R 16/02*    (2006.01)
(Continued)

(52) U.S. Cl.
CPC .............. *B62D 1/046* (2013.01); *B60R 16/02* (2013.01); *B62D 1/04* (2013.01); *G06F 3/016* (2013.01); *G06F 3/03547* (2013.01); *B60R 1/00* (2013.01); *B60R 2300/602* (2013.01); *B60R 2300/607* (2013.01)

(58) Field of Classification Search
CPC ............. G06F 3/01; G06F 2203/04808; G06F 3/03547; G06F 3/0416; G06F 3/04883; G06F 3/016; G06F 3/041–0412; G06F 3/0414–04146; B60K 2370/1438; B60K 2370/782; B60K 37/06; G01C 21/3664; G01C 21/367; B60R 16/02; B60R 1/00;
(Continued)

(56) References Cited

U.S. PATENT DOCUMENTS 6,208,330 B1    3/2001    Hasegawa et al.
8,773,394 B2    7/2014    Suzuki
(Continued)

FOREIGN PATENT DOCUMENTS

DE    102008035907 A1    2/2010
JP    H10-254623 A    9/1998
(Continued)

OTHER PUBLICATIONS

International Search Report issued in PCT/JP2014/005067; dated Dec. 16, 2014.
(Continued)

*Primary Examiner* — Temesghen Ghebretinsae
*Assistant Examiner* — Ivelisse Martinez Quiles
(74) *Attorney, Agent, or Firm* — Studebaker & Brackett PC

(57) ABSTRACT

A vehicle and a steering unit can improve safety. A vehicle includes a steering wheel and a touchpad disposed on the steering wheel. The vehicle enables control of a controlled apparatus by a gesture on the touchpad of the steering wheel upon detecting a predetermined pressure on the touchpad of the steering wheel and provides a tactile sensation from the touchpad in accordance with the gesture on the touchpad of the steering wheel.

7 Claims, 11 Drawing Sheets

(51) Int. Cl.
*G06F 3/01* (2006.01)
*G06F 3/0354* (2013.01)
*B60R 1/00* (2022.01)

(58) Field of Classification Search
CPC ........ B60R 2300/602; B60R 2300/607; B62D 1/04–046
See application file for complete search history.

(56) References Cited

U.S. PATENT DOCUMENTS

| | | | |
|---|---|---|---|
| 2003/0142081 A1* | 7/2003 | Iizuka | G06F 1/1626 345/173 |
| 2009/0237374 A1* | 9/2009 | Li | G06F 3/0488 345/174 |
| 2010/0238115 A1 | 9/2010 | Komaarashi et al. | |
| 2011/0030502 A1* | 2/2011 | Lathrop | G06F 3/04883 74/552 |
| 2011/0102345 A1* | 5/2011 | Kim | G06F 3/04883 345/173 |
| 2011/0169750 A1* | 7/2011 | Pivonka | G06F 3/04883 345/173 |
| 2011/0187667 A1 | 8/2011 | Kaida | |
| 2012/0249473 A1 | 10/2012 | Suzuki | |
| 2013/0155018 A1* | 6/2013 | Dagdeviren | G06F 3/03543 345/174 |
| 2013/0222300 A1* | 8/2013 | Sanma | G06F 3/0418 345/173 |
| 2013/0271397 A1* | 10/2013 | Macdougall | G06F 3/017 345/173 |
| 2013/0285949 A1* | 10/2013 | Manabe | B60K 37/06 345/173 |
| 2014/0062872 A1 | 3/2014 | Tanaka | |
| 2014/0090505 A1* | 4/2014 | Okuyama | G06F 3/0219 74/485 |
| 2014/0232677 A1 | 8/2014 | Yamane | |
| 2015/0067495 A1* | 3/2015 | Bernstein | G06F 3/04847 715/702 |
| 2015/0097793 A1* | 4/2015 | Lisseman | G06F 3/0414 345/173 |
| 2015/0158388 A1* | 6/2015 | Kalbus | B60K 35/00 701/36 |
| 2016/0107654 A1* | 4/2016 | Tan | B60W 50/08 701/36 |
| 2016/0117043 A1* | 4/2016 | Kim | G06F 3/044 345/174 |
| 2016/0188069 A1* | 6/2016 | Tao | G06F 3/0414 345/173 |

FOREIGN PATENT DOCUMENTS

| | | |
|---|---|---|
| JP | 2009-298285 A | 12/2009 |
| JP | 2009-301299 A | 12/2009 |
| JP | 2010-224684 A | 10/2010 |
| JP | 2012-206692 A | 10/2012 |
| JP | 2013-095289 A | 5/2013 |
| JP | 2013-250726 A | 12/2013 |
| JP | 2013-254529 A | 12/2013 |
| JP | 2014-095948 A | 5/2014 |
| JP | 2014-102649 A | 6/2014 |
| WO | 2013/104919 A1 | 7/2013 |

OTHER PUBLICATIONS

Written Opinion issued in PCT/JP2014/005067; dated Dec. 16, 2014; with English language Concise Explanation.

An Office Action; "Notice of Reasons for Rejection," mailed by the Japanese Patent Office dated Feb. 10, 2015, which corresponds to Japanese Patent Application No. 2014-550572 and is related to the present application; with English language Concise Explanation.

An Office Action; "Notice of Reasons for Rejection," mailed by the Japanese Patent Office dated Aug. 2, 2016, which corresponds to Japanese Patent Application No. 2014-550572 and is related to the present application; with English language Concise Explanation.

An Office Action; "Notice of Reasons for Rejection," mailed by the Japanese Patent Office dated Nov. 8, 2016, which corresponds to Japanese Patent Application No. 2016-190403 and is related to the present application; with English language Concise Explanation.

* cited by examiner

FIG. 3

| Gesture on touchpad | Smartphone operation |
|---|---|
| Press left and right touchpads at approximately the same time | Double tap |
| Press either left or right touchpad | Tap |
| Bring left and right fingers closer together | Pinch-in |
| Move left and right fingers apart | Pinch-out |
| Slide left and right fingers | Swipe |
| Flick left and right fingers | Flick |

VEHICLE AND STEERING UNIT

TECHNICAL FIELD

The present disclosure relates to a vehicle and a steering unit.

BACKGROUND

Steering wheels provided with a touchpad are known.

SUMMARY

A vehicle according to the present disclosure includes:
a steering wheel; and
a touchpad disposed on the steering wheel;
such that the vehicle enables control of a controlled apparatus by a gesture on the touchpad of the steering wheel upon detecting a predetermined pressure on the touchpad of the steering wheel; and
such that the vehicle provides a tactile sensation from the touchpad in accordance with the gesture on the touchpad of the steering wheel.

Another vehicle according to the present disclosure includes:
a steering wheel;
a touchpad disposed on the steering wheel; and
a main ECU executing control of the vehicle;
such that the main ECU
enables control of a controlled apparatus by a gesture on the touchpad of the steering wheel upon detecting a predetermined pressure on the touchpad of the steering wheel; and
provides a tactile sensation from the touchpad in accordance with the gesture on the touchpad of the steering wheel.

The present disclosure may also be implemented as steering units substantially corresponding to the above-described vehicles, and such steering units are to be understood as included in the scope of the present disclosure.

For example, a steering unit according to the present disclosure includes:
a steering wheel; and
a touchpad disposed on the steering wheel;
such that the steering unit enables control of a controlled apparatus by a gesture on the touchpad of the steering wheel upon detecting a predetermined pressure on the touchpad of the steering wheel; and
such that the steering unit provides a tactile sensation from the touchpad in accordance with the gesture on the touchpad of the steering wheel.

BRIEF DESCRIPTION OF THE DRAWINGS

In the accompanying drawings:

FIG. 3 illustrates an example of the correspondence relationships between gestures on the touchpad(s) and smartphone operations;

DETAILED DESCRIPTION

For example, a steering wheel that includes a touchpad as an input apparatus is known. In the known input apparatus, while gripping the steering wheel, the driver for example performs an operation on a controlled apparatus, such as a navigation apparatus, by contacting a finger to the touchpad.

Since the driver normally drives while gripping the steering wheel, however, the driver may contact the touchpad provided on the steering wheel unintentionally, for example while maneuvering the steering wheel. If the driver unintentionally contacts the touchpad, an operation not intended by the driver is performed on the controlled apparatus. If an operation not intended by the driver is performed on the controlled apparatus, the driver may be distracted by the operation performed on the controlled apparatus. This is dangerous when driving a vehicle.

Also, when the driver performs an operation on the touchpad, it is thought that the driver may wish to confirm that the intended operation was performed on the controlled apparatus. If the controlled apparatus is a navigation apparatus, for example, the driver confirms whether the desired operation is being performed by looking at the display monitor of the navigation apparatus. From the standpoint of safety, however, the driver needs to look at the surroundings of the vehicle while driving. Therefore, it is dangerous to stop looking at the surroundings of the vehicle and instead look at a display such as the display monitor.

Therefore, it would be helpful to provide a vehicle and steering unit that can improve safety.

The following describes embodiments in detail with reference to the drawings.

Embodiment 1

Figure 1:
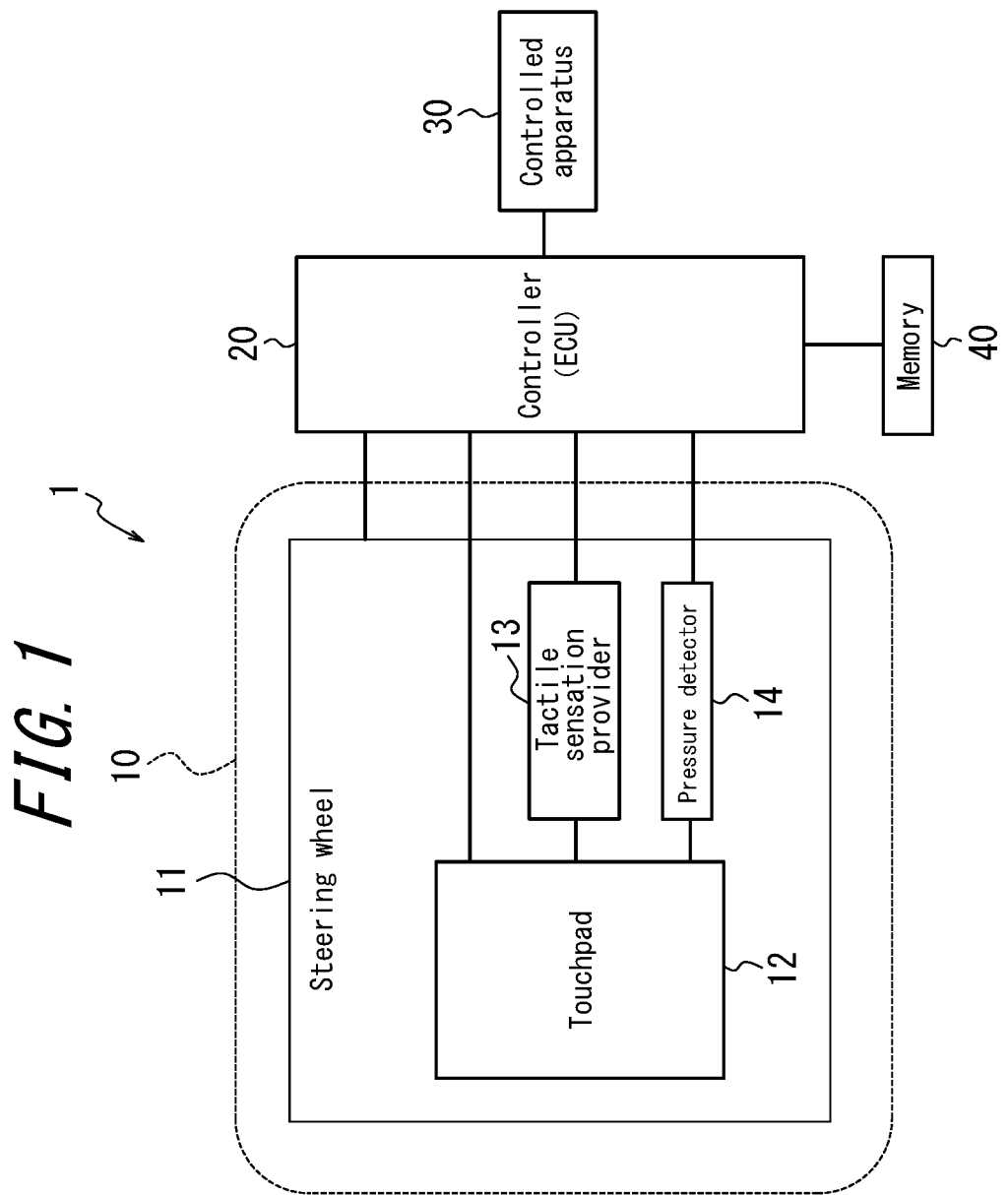
FIG. 1 is a functional block diagram schematically illustrating the configuration of a vehicle according to Embodiment 1.

FIG. 1 is a functional block diagram schematically illustrating the configuration of a vehicle according to Embodiment 1. A vehicle 1 is provided with a steering unit 10, a controller 20, a controlled apparatus 30, and a memory 40.

The steering unit 10 includes a steering wheel 11. In this embodiment, the steering unit 10 may, in some cases, be configured by only the steering wheel 11. The steering wheel 11 is provided with a touchpad 12, a tactile sensation provider 13, and a pressure detector 14.

Figure 2:
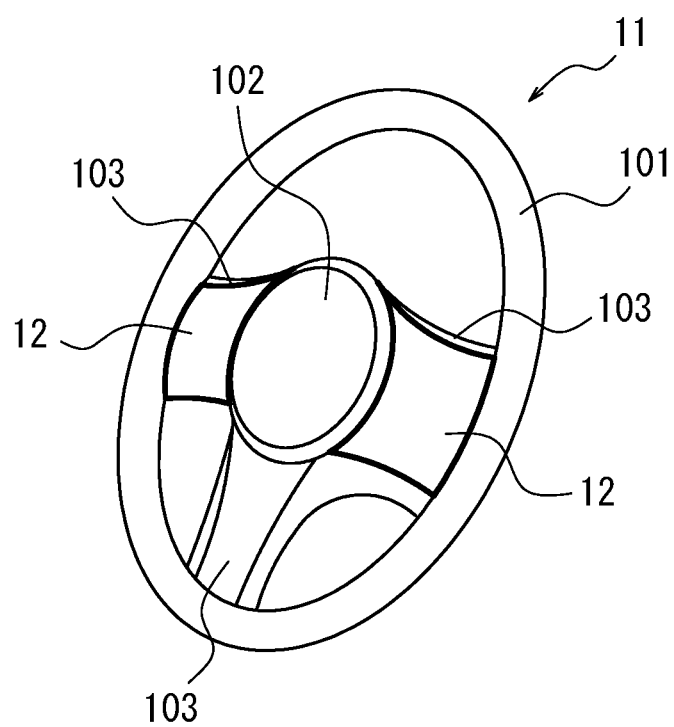
FIG. 2 is an external perspective view of an example of the steering wheel in FIG. 1.

FIG. 2 is an external perspective view of an example of the steering wheel 11 in FIG. 1. As illustrated in FIG. 2, the steering wheel 11 is provided with a rim 101, a boss 102, and a plurality of spokes 103. The rim 101 is gripped by the driver's hands. The boss 102 is disposed at the center of the rim 101, is connected to a non-illustrated steering shaft, and stores an airbag apparatus, horn switch, and the like. The spokes 103 connect the rim 101 and the boss 102. The steering wheel 11 in FIG. 2 is provided with three spokes 103 that extend from the boss 102 horizontally and downward.

One touchpad 12 is disposed on each of the spokes 103 extending horizontally from the boss 102. The arrangement of the touchpads 12 is not limited to the example in FIG. 2. When the driver drives while gripping the rim 101, however, the touchpads 12 may be provided at positions that can be contacted by the driver's fingers (as used herein, the term "finger" may refer to a finger or a thumb). The driver that rides in the vehicle 1 according to this embodiment steers the vehicle 1 by a steering operation and can also operate the controlled apparatus 30 via the controller 20 by an input operation, such as a gesture, on the touchpads 12 using the fingers.

The touchpad 12 detects contact by a contacting object, such as the driver's finger. The touchpad 12 detects the position (coordinates) of contact by the contacting object and notifies the controller 20 of information related to the detected contact.

The tactile sensation provider 13 is configured using, for example, a piezoelectric vibrator and vibrates the touchpad 12. By generating vibration with a predetermined vibration pattern, the tactile sensation provider 13 provides a tactile sensation to the contacting object in contact with the touchpad 12. In this embodiment, the tactile sensation provider 13 generates vibration based on a drive signal supplied by the controller 20. In other words, in this embodiment, the controller 20 controls the tactile sensation provider 13 so that the tactile sensation provider 13 vibrates. The controller 20 may cause the tactile sensation provider 13 to vibrate so as to provide a tactile sensation to the position (coordinates) at which the contacting object is in contact with the touchpad 12. In accordance with the position of contact by the contacting object detected by the touchpad 12 and the below-described gesture on the touchpad 12 by the driver, the controller 20 can also perform control to vary the drive signal that drives the tactile sensation provider 13. In this case, the tactile sensation provider 13 vibrates with different vibration patterns in accordance with the position of contact by the contacting object detected by the touchpad 12 and the below-described gesture on the touchpad 12 by the driver. The tactile sensation provider 13 reproduces a variety of vibration patterns by vibrating at different amplitudes, frequencies, and the like based on the drive signal applied by the controller 20. When pressed, the touchpad 12 does not physically change, for example as does a pushbutton switch. Therefore, when the tactile sensation provider 13 is not provided, the driver needs to confirm whether pressure was input by the output of control performed as a result of the pressure. With the vehicle 1 according to this embodiment, however, the driver can confirm an operation performed on the touchpad 12 without visual confirmation, but rather by the vibration (tactile sensation) generated by the tactile sensation provider 13.

The pressure detector 14 detects pressure on the touchpad 12 from the contacting object, such as the driver's finger. The pressure detector 14 for example may be configured using an element such as a strain gauge sensor, a piezoelectric element, or the like that experiences a change in physical or electrical characteristics (strain, resistance, voltage, or the like) in response to pressure. When the pressure detector 14 is configured using a piezoelectric element or the like, for example, the magnitude of the voltage (voltage value (referred to below as information related to pressure)), which is an electrical characteristic, of the piezoelectric element in the pressure detector 14 changes in accordance with the magnitude of the load (force) of the pressure on the touchpad 12 (or the speed at which the magnitude of the load (force) changes (acceleration)).

The controller 20 acquires information related to pressure by the pressure detector 14 notifying the controller 20 of information related to pressure or by the controller 20 detecting information related to pressure on the pressure detector 14. In other words, the controller 20 acquires the information related to pressure on the touchpad 12 from the pressure detector 14. Note that instead of a voltage value, the information related to pressure may be power, resistance, magnitude of the load, or the like related to pressure.

The tactile sensation provider 13 and the pressure detector 14 may be configured integrally. When both are configured using a piezoelectric element, the pressure detector 14 and the tactile sensation provider 13 may be configured as a pressure detector/tactile sensation provider that shares a common piezoelectric element. The reason is that a piezoelectric element generates voltage when pressure is applied and deforms upon application of voltage.

As illustrated in FIG. 2, when a plurality of touchpads 12 are disposed on the steering wheel 11, the steering wheel 11 may include a plurality of tactile sensation providers 13 and pressure detectors 14 (the same number as the number of touchpads 12). The pressure detectors 14 are associated with the corresponding touchpads 12 and detect pressure on the corresponding touchpads 12. The tactile sensation providers 13 are also associated with the corresponding touchpads 12 and vibrate the corresponding touchpads 12.

The controller 20 is a processor that controls and manages the vehicle 1 overall. The controller 20 is configured using a processor such as a Central Processing Unit (CPU) that executes a program prescribing control procedures. Such a program may, for example, be stored in the memory 40 or the like. In the vehicle 1, the controller 20 may be configured by an ECU (Electric Control Unit or Engine Control Unit). The ECU controls the vehicle 1. In other words, the ECU controls the controlled apparatus 30 used in relation to the vehicle 1. The controller 20 may be configured by one ECU or may, for example, be configured by a main ECU that controls the vehicle 1 overall and a plurality of sub-ECUs that perform a portion of the control of the controlled apparatus 30.

Upon detecting a predetermined pressure (first pressure) on the touchpad 12 based on the information related to pressure acquired from the pressure detector 14, the controller 20 allows control of the controlled apparatus 30 by a gesture on the touchpad 12. In other words, upon detecting the first pressure on the touchpad 12, the controller 20 allows receipt of an operation by a gesture on the touchpad 12 from the driver. Upon detecting a gesture on the touchpad 12 while in a state of enabling control of the controlled apparatus 30 by a gesture on the touchpad 12, the controller 20 controls the controlled apparatus 30 in accordance with the gesture. Also, in accordance with the gesture on the touchpad 12, the controller 20 generates a drive signal that drives the tactile sensation provider 13 and applies the drive signal to the tactile sensation provider 13.

After enabling control of the controlled apparatus 30 by a gesture on the touchpad 12 as a result of pressure on the touchpad 12 by the driver, the controller 20 maintains the state enabling control of the controlled apparatus 30 by a gesture on the touchpad 12 until the contacting object, such as a finger, is released from the touchpad 12. After enabling control of the controlled apparatus 30 by a gesture on the touchpad 12, the controller 20 returns to a state of not receiving control of the controlled apparatus 30 by a gesture on the touchpad 12 upon detecting that the contacting object has been released from the touchpad 12. In other words, upon detecting that the contacting object, such as a finger, has been released from the touchpad 12, the controller 20 stops control of the controlled apparatus 30 by a gesture on the touchpad 12. Once the driver releases the contacting object, such as a finger, from the touchpad 12, a state is entered in which the controlled apparatus 30 cannot be operated by a gesture on the touchpad 12.

The controlled apparatus 30 is any apparatus used in relation to the vehicle 1, starting with the transmission, car air conditioner, power windows, car navigation system, car audio, or head-up display. The controlled apparatus 30 is not limited to being an apparatus provided in the vehicle 1 in advance. The controlled apparatus 30 may, for example, be an external device, such as the driver's mobile phone or tablet, that can be connected via a connection interface included in the vehicle 1. By a gesture on the touchpad 12, the driver can operate the external device connected to the vehicle 1.

The memory 40 may be configured by a semiconductor memory, a magnetic memory, or the like. The memory 40 stores a variety of information, control programs executed by the controller 20, and the like. The memory 40 for example stores combinations of the control content executed by the controller 20 on the controlled apparatus 30 and the vibration pattern provided by the tactile sensation provider 13.

Next, operations such as gestures that the driver performs on the touchpads 12 and the processing executed by the controller 20 based on the operations are described.

In the case of performing an operation with the touchpads 12 while driving, the driver presses the touchpads 12 with the fingers of both hands while gripping the rim 101 of the steering wheel 11. The controller 20 acquires information related to pressure on each touchpad 12 as detected by the pressure detector 14. Upon detecting that the pressure on the touchpad 12 is the first pressure based on the acquired information related to pressure, the controller 20 allows control of the controlled apparatus 30 by a gesture on the touchpad 12. For example, upon detecting that the pressure on the touchpad 12 is the first pressure, the controller 20 allows receipt of an operation by a gesture on the touchpad 12. The first pressure is, for example, a pressure equal to or greater than a predetermined reference set in advance and may be set appropriately.

In addition to enabling control of the controlled apparatus 30 by a gesture on the touchpad 12, the controller 20 also generates a drive signal that drives the tactile sensation provider 13. Based on the drive signal from the controller 20, the tactile sensation provider 13 vibrates in a predetermined vibration pattern.

Upon control of the controlled apparatus 30 by a gesture on the touchpad 12 being enabled, the driver can operate the controlled apparatus 30 by performing a gesture on the touchpad 12 while contacting the touchpad 12 with a finger. The gesture on the touchpad 12 that the driver performs in order to operate the controlled apparatus 30 may be any gesture for each operation. Considering how electronic devices, such as smartphones, that can be operated by finger movements have become widespread, it is thought that drivers can easily adapt if the gestures for operating the controlled apparatus 30 in the vehicle 1 conform to the operations of an electronic device such as a smartphone. The gestures on the touchpad(s) 12 for operating the controlled apparatus 30 of the vehicle 1 are described as conforming to the operations of a smartphone.

FIG. 3 illustrates an example of correspondence relationships between gestures on the touchpad(s) 12 and smartphone operations. The correspondence relationships in FIG. 3 are only an example, and the correspondence relationships between gestures on the touchpad(s) 12 and smartphone operations are not limited to the example in FIG. 3. The correspondence relationships in FIG. 3 are described in order.

Figure 4:
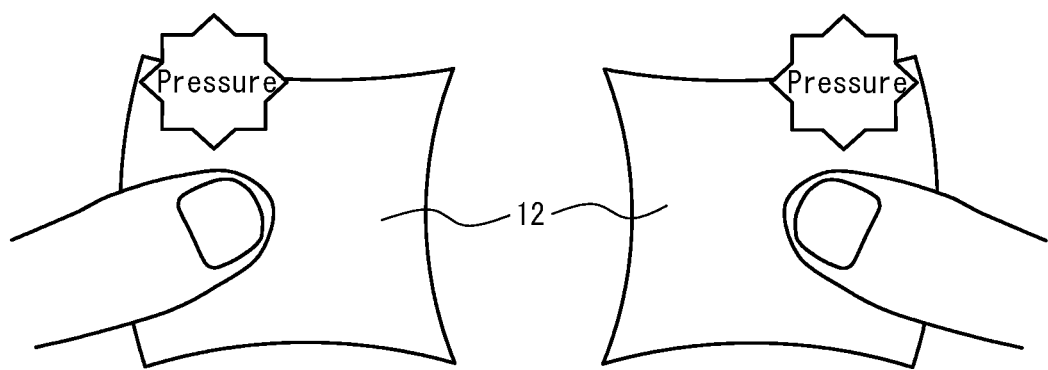
FIG. 4 illustrates an example of a gesture on the touchpads by the driver.

As shown in FIG. 3, a gesture to press both of the touchpads 12 disposed on the left and right spokes 103 at approximately the same time for example corresponds to a double tap operation on a smartphone. FIG. 4 schematically illustrates a gesture to press both of the left and right touchpads 12 at approximately the same time. The controller 20 acquires information related to pressure on the touchpads 12 as detected by the pressure detector 14 based on the gesture by the driver to press both of the left and right touchpads 12 at approximately the same time. Based on the acquired information related to pressure, the controller 20 performs control corresponding to the gesture upon detecting that the pressure on both the left and right touchpads 12 is a second pressure. For example, the control corresponding to the gesture may be "execute a function to monitor surroundings". In response to the gesture, the controller 20 for example causes an image of the surroundings of the vehicle 1, captured by a camera provided in the vehicle 1, to be displayed on the display. By a gesture to press both of the left and right touchpads 12 at approximately the same time, the controller may execute any control associated with the gesture instead of executing a function. The second pressure is, for example, a pressure equal to or greater than a predetermined reference set in advance. A higher pressure than the first pressure may be used as a reference for the second pressure.

Also, in accordance with the gesture on the touchpads 12, the controller 20 generates a drive signal that drives the tactile sensation providers 13. Upon the controller 20 applying the generated signal to the tactile sensation providers 13, the tactile sensation providers 13 vibrate in a predetermined vibration pattern. For example, after the pressure detectors 14 detect a predetermined pressure, the tactile sensation providers 13 can, upon being driven in a predetermined way, provide the driver of the vehicle with a realistic sense of touch such as the one obtained when actually pressing a mechanical key or button. Based on the vibration transmitted from the tactile sensation providers 13 to the fingers contacting the touchpads 12, the driver can confirm that the gesture on the touchpads 12 has been accepted without visual confirmation.

As shown in FIG. 3, a gesture to press one of the touchpads 12 disposed on the left and right spokes 103 for example corresponds to a tap operation on a smartphone.

Figure 5:
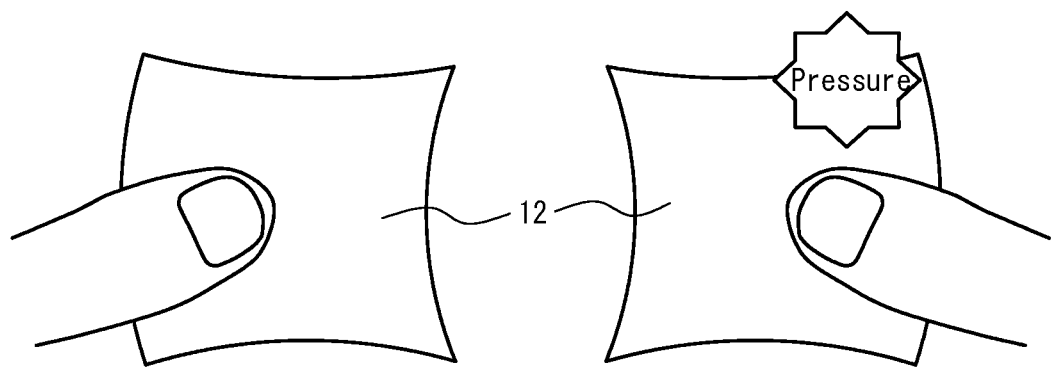
FIG. 5 illustrates an example of a gesture on the touchpad by the driver.
Figure 10:
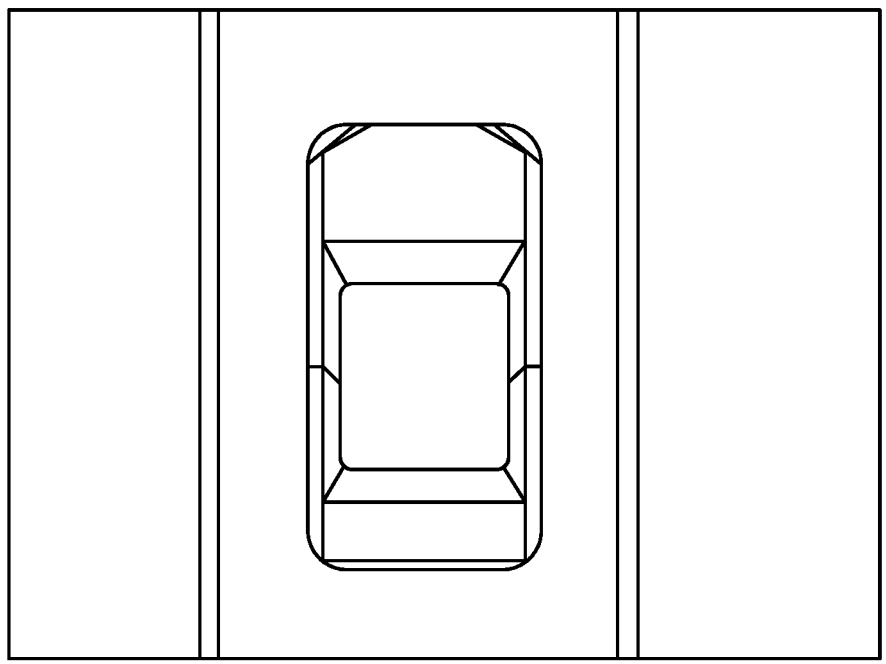
FIG. 10 illustrates an example of an image displayed on the display of the vehicle as the result of a gesture on the touchpad.

FIG. 5 schematically illustrates a gesture to press one of the touchpads 12. The controller 20 acquires information related to pressure on the touchpads 12 as detected by the pressure detector 14 based on the gesture by the driver to press one of the touchpads 12. Based on the acquired information related to pressure, the controller 20 performs control corresponding to the gesture upon detecting that the pressure on the touchpad 12 is a third pressure. The controller 20 for example controls the execution mode within the function of the controlled apparatus 30 executed by the gesture illustrated in FIG. 4. For example, in the function to monitor surroundings executed by the gesture illustrated in FIG. 4, the driver can cause either an overhead image of the vehicle 1 combined from a plurality of cameras (an around view) or a front (or back) image captured by one camera to be displayed on the display. Based on the gesture to press one of the left and right touchpads 12, the controller 20 causes the selected image to be displayed on the display. It is assumed here that the driver selects an overhead image. FIG. 10 is an example of an overhead image displayed on the display by the driver's gesture.

The third pressure is, for example, a pressure equal to or greater than a predetermined reference set in advance. A higher pressure than the first pressure may be used as a reference for the third pressure. The same pressure as the second pressure may also be used as a reference for the third pressure. The controller 20 may perform the same control in the case of a gesture to press the left touchpad 12 and a gesture to press the right touchpad 12. The controller 20 may also perform different control based on whether the left or the right touchpad 12 is pressed.

In accordance with the gesture on the touchpad 12, the controller 20 generates a drive signal that drives the tactile sensation provider 13. Upon the drive signal generated in the controller 20 being applied to the tactile sensation provider 13, the tactile sensation provider 13 vibrates in a predetermined vibration pattern. In this case, the controller 20 may apply a drive signal to the tactile sensation provider 13 so as to vibrate the touchpad 12 for which pressure was detected between the left and right touchpads 12. After the pressure detector 14 detects a predetermined pressure, the tactile sensation provider 13, upon being driven in a predetermined way, provides the driver of the vehicle with a realistic sense of touch such as the one obtained when actually pressing a mechanical key or button. Based on the vibration transmitted from the tactile sensation provider 13 to the finger contacting the touchpad 12, the driver can confirm that the gesture on one of the touchpads 12 has been accepted without visual confirmation.

Figure 6:
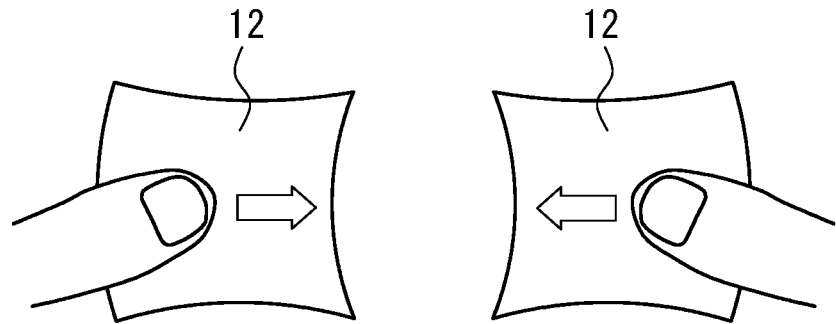
FIG. 6 illustrates an example of a gesture on the touchpads by the driver.
Figure 11:
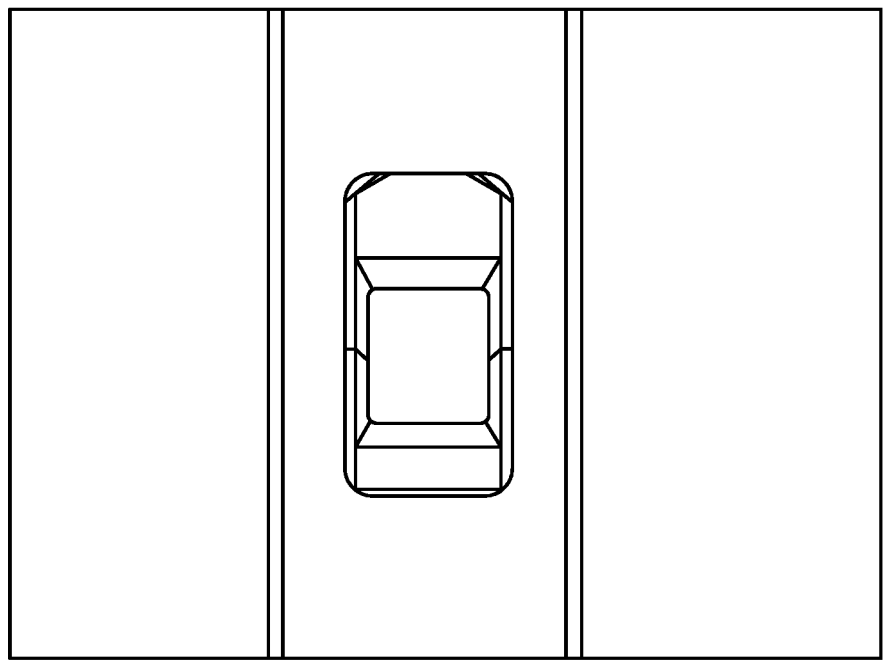
FIG. 11 illustrates an example of an image displayed on the display of the vehicle as the result of a gesture on the touchpad.

As shown in FIG. 3, a gesture to bring the left and right fingers, contacting the touchpads 12 disposed on the left and right spokes 103, closer together for example corresponds to a pinch in operation on a smartphone. FIG. 6 schematically illustrates a gesture to bring the left and right fingers closer together. The controller 20 acquires information related to the displacement of the fingers' positions (coordinates) from the touchpads 12. Based on the acquired information related to displacement, the controller 20 performs control corresponding to the gesture upon detecting that the positions of the left and right fingers are closer. By the gesture illustrated in FIG. 6, the controller 20 for example performs control to shrink the overhead image displayed on the display. For example, when the overhead image illustrated in FIG. 10 is being displayed on the display, suppose that the driver performs a gesture to bring the left and right fingers closer together. In this case, the controller 20 performs control by image processing to shrink the overhead image displayed on the display and for example causes the overhead image illustrated in FIG. 11 to be displayed on the display.

In accordance with the gesture on the touchpads 12, the controller 20 generates a drive signal that drives the tactile sensation providers 13. Upon the drive signal generated in the controller 20 being applied to the tactile sensation providers 13, the tactile sensation providers 13 vibrate in a predetermined vibration pattern. After the pressure detectors 14 detect a predetermined pressure, the tactile sensation providers 13, upon being driven in a predetermined way, provide the driver of the vehicle with a tactile sensation of having traced over a surface. During the time that the driver is performing the gesture to bring the left and right fingers together, the controller 20 may apply a drive signal to the tactile sensation providers 13 and cause the tactile sensation providers 13 to vibrate, so as to continue vibrating the touchpads 12. Based on the vibration transmitted from the tactile sensation providers 13 to the fingers contacting the touchpads 12, the driver can confirm that the gesture on the touchpads 12 has been accepted without visual confirmation.

Figure 7:
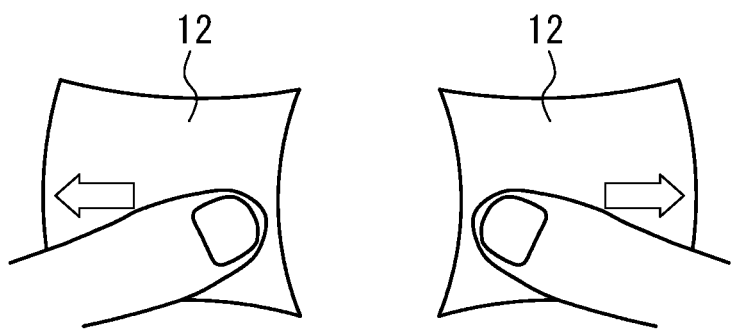
FIG. 7 illustrates an example of a gesture on the touchpads by the driver.
Figure 12:
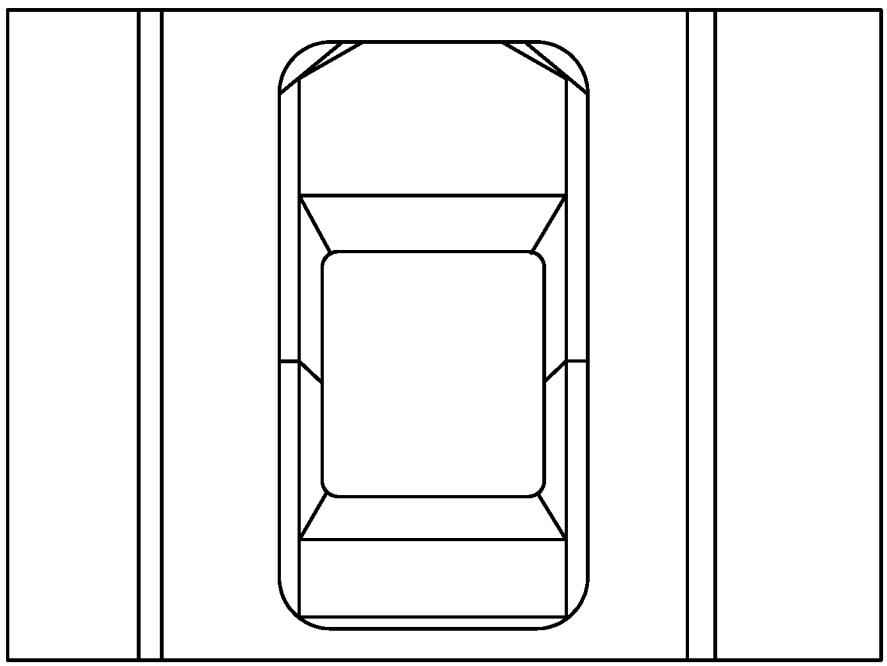
FIG. 12 illustrates an example of an image displayed on the display of the vehicle as the result of a gesture on the touchpad.

As shown in FIG. 3, a gesture to move apart the left and right fingers contacting the touchpads 12 disposed on the left and right spokes 103 for example corresponds to a pinch out operation on a smartphone. FIG. 7 schematically illustrates a gesture to move the left and right fingers apart. The controller 20 acquires information related to the displacement of the fingers' positions (coordinates) from the touchpads 12. Based on the acquired information related to displacement, the controller 20 performs control corresponding to the gesture upon detecting that the positions of the left and right fingers are farther apart. By the gesture illustrated in FIG. 7, the controller 20 for example performs control to expand the overhead image displayed on the display. For example, when the overhead image illustrated in FIG. 10 is being displayed on the display, suppose that the driver performs a gesture to move the left and right fingers apart. In this case, the controller 20 performs control by image processing to expand the overhead image displayed on the display and for example causes the overhead image illustrated in FIG. 12 to be displayed on the display.

In accordance with the gesture on the touchpads 12, the controller 20 generates a drive signal that drives the tactile sensation providers 13. Upon the drive signal generated in the controller 20 being applied to the tactile sensation providers 13, the tactile sensation providers 13 vibrate in a predetermined vibration pattern. After the pressure detectors 14 detect a predetermined pressure, the tactile sensation providers 13, upon being driven in a predetermined way, provide the driver of the vehicle with a tactile sensation of having traced over a surface. During the time that the driver is performing the gesture to move the left and right fingers apart, the controller 20 may apply a drive signal to the tactile sensation providers 13 and cause the tactile sensation providers 13 to vibrate, so as to continue vibrating the touchpads 12. Based on the vibration transmitted from the tactile sensation providers 13 to the fingers contacting the touchpads 12, the driver can confirm that the gesture on the touchpads 12 has been accepted without visual confirmation.

Figure 8:
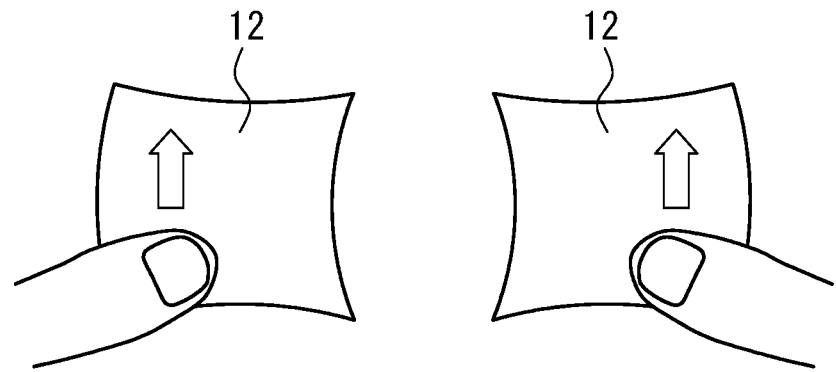
FIG. 8 illustrates an example of a gesture on the touchpads by the driver.

As shown in FIG. 3, a gesture to slide the left and right fingers contacting the touchpads 12 disposed on the left and right spokes 103 for example corresponds to a swipe operation on a smartphone. FIG. 8 schematically illustrates a gesture to slide the left and right fingers upward. The controller 20 acquires information related to the displacement of the fingers' positions (coordinates) from the touchpads 12. Based on the acquired information related to displacement, the controller 20 performs control corresponding to the gesture upon detecting that the left and right fingers have been displaced upward. By the gesture illustrated in FIG. 8, the controller 20 for example performs control to move the range being shown by the overhead image displayed on the display. For example, when the overhead image illustrated in FIG. 10 is being displayed on the display, suppose that the driver performs a gesture to slide the left and right fingers upward. In this case, the controller 20 performs control by image processing to move the range displayed on the display towards the back of the vehicle 1 and for example causes the overhead image illustrated in FIG. 13 to be displayed on the display.

Figure 9A:
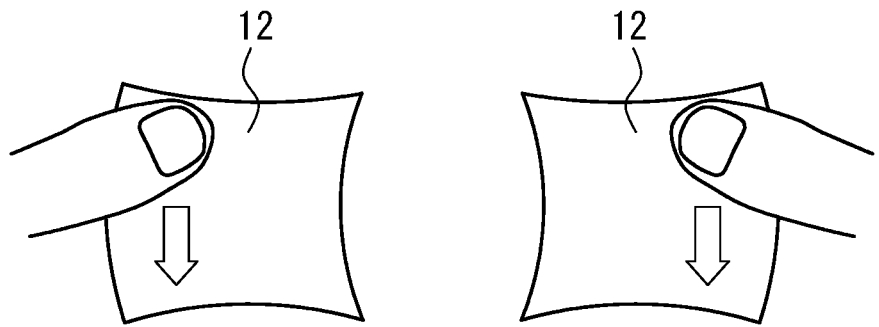
FIG. 9A illustrates an example of a gesture on the touchpads by the driver.
Figure 9B:
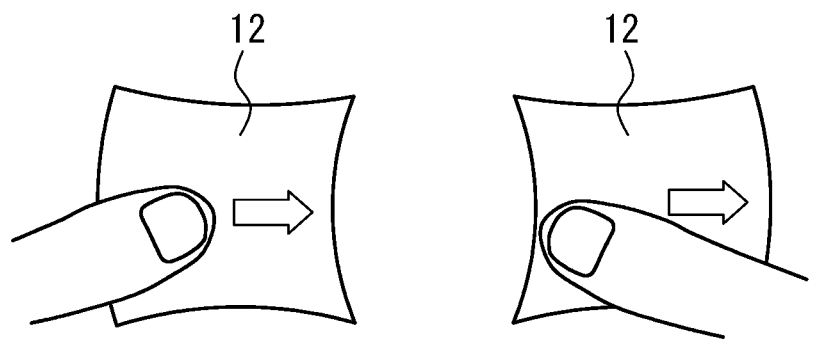
FIG. 9B illustrates an example of a gesture on the touchpads by the driver.
Figure 9C:
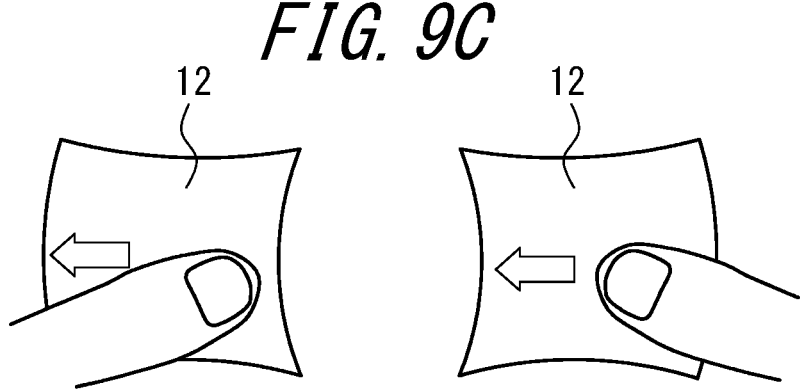
FIG. 9C illustrates an example of a gesture on the touchpads by the driver.

The gesture to slide the left and right fingers is not limited to sliding the fingers upward. The gesture to slide the left and right fingers may, as illustrated in FIG. 9A, FIG. 9B, and FIG. 9C, slide the fingers downward, to the right, or to the left. Also, the gesture to slide the left and right fingers may slide the fingers in any direction other than the vertical and horizontal directions illustrated in FIG. 8, FIG. 9A, FIG. 9B, and FIG. 9C. The controller 20 detects the direction in which the fingers are slid on the touchpads 12 and performs control to move the display range of the overhead image in accordance with the detected direction.

In accordance with the gesture on the touchpads 12, the controller 20 generates a drive signal that drives the tactile sensation providers 13. Upon the drive signal generated in the controller 20 being applied to the tactile sensation providers 13, the tactile sensation providers 13 vibrate in a predetermined vibration pattern. After the pressure detectors 14 detect a predetermined pressure, the tactile sensation providers 13, upon being driven in a predetermined way, provide the driver of the vehicle with a tactile sensation of having traced over a surface. During the time that the driver is performing the gesture to slide the left and right fingers, the controller 20 may apply a drive signal to the tactile sensation providers 13 and cause the tactile sensation providers 13 to vibrate, so as to continue vibrating the touchpads 12. Based on the vibration transmitted from the tactile sensation providers 13 to the fingers contacting the touchpads 12, the driver can confirm that the gesture to slide the left and right fingers has been accepted without visual confirmation. The controller 20 may cause the tactile sensation providers 13 to vibrate with a different vibration pattern in accordance with the direction in which the driver's fingers move. As a result, while confirming that the gesture on the touchpads 12 has been accepted without visual confirmation, the driver can also confirm whether control corresponding to the direction in which the fingers were slid has been executed.

Figure 13:
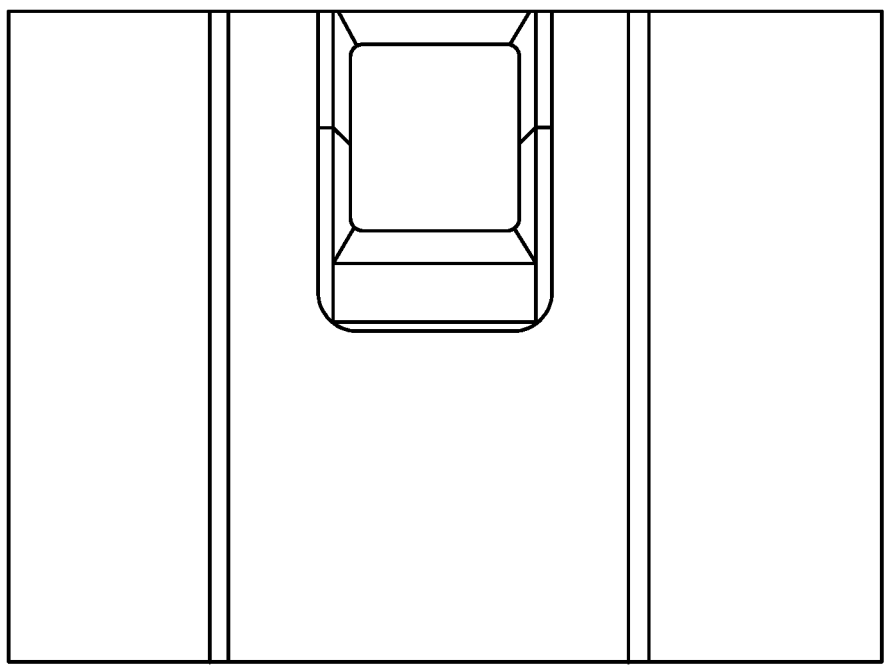
FIG. 13 illustrates an example of an image displayed on the display of the vehicle as the result of a gesture on the touchpad.

As shown in FIG. 3, a gesture to flick the left and right fingers contacting the touchpads 12 disposed on the left and right spokes 103 for example corresponds to a flick operation on a smartphone. For example when flicking the fingers upwards, the driver moves the fingers upward while in contact with the touchpads 12 and releases the fingers from the touchpads 12 part way through. From the touchpads 12, the controller 20 acquires information related to the displacement of the fingers' positions (coordinates) and information related to contact of the fingers on the touchpads 12. Based on the acquired information related to displacement and the information related to contact of the fingers, the controller 20 detects the upward acceleration when the fingers were released from the touchpads 12. The controller 20 then performs control based on the detected direction of displacement and acceleration. For example, the controller 20 performs control to move the range displayed by the overhead image displayed on the display at a speed corresponding to the detected acceleration. The controller 20 slows down the movement of the display range of the image at a predetermined acceleration and eventually stops moving the display range. For example, when the overhead image illustrated in FIG. 10 is being displayed on the display, suppose that the driver performs a gesture to flick the left and right fingers upward. In this case, the controller 20 performs control by image processing to start moving the range displayed on the display towards the back of the vehicle 1 at a predetermined speed and for example stops moving the range once the overhead image illustrated in FIG. 13 is displayed on the display.

The driver can move the range in any direction by a gesture to flick the left and right fingers.

In accordance with the gesture on the touchpads 12, the controller 20 generates a drive signal that drives the tactile sensation providers 13. Upon the drive signal generated in the controller 20 being applied to the tactile sensation providers 13, the tactile sensation providers 13 vibrate in a predetermined vibration pattern. During the time that the driver's fingers are moving while in contact with the touchpads 12, the controller 20 may apply a drive signal to the tactile sensation providers 13 and cause the tactile sensation providers 13 to vibrate. When the driver releases the fingers from the touchpads 12, the controller 20 may further apply a drive signal to the tactile sensation providers 13 and cause the tactile sensation providers 13 to vibrate. The drive signal applied to the tactile sensation providers 13 when the driver's fingers are released from the touchpads 12 may be different from the drive signal applied to the tactile sensation providers 13 during the time that the driver's fingers are moving while in contact with the touchpads 12. Based on the vibration transmitted from the tactile sensation providers 13 to the fingers contacting the touchpads 12, the driver can confirm that the gesture on the touchpads 12 has been accepted without visual confirmation.

The controller 20 may cause the tactile sensation providers 13 to vibrate with a different vibration pattern in accordance with the direction in which the driver's fingers move. As a result, the driver can confirm whether control corresponding to the direction in which the fingers were flicked has been executed by vibration transmitted to the fingers, without visual confirmation.

Gestures performed by the driver and control performed by the controller 20 have been described, but the control by the controller 20 based on gestures is not limited to the above-described examples. The controller 20 may perform any control associated with gestures.

As one example, the case of the driver operating the car audio as the controlled apparatus 30 by a gesture on the touchpads 12 is described briefly. In a state in which control of the controlled apparatus 30 by a gesture has been enabled by pressure on the touchpads 12, the driver for example selects a song to be played back by the car audio by pressing one or both of the touchpads 12 disposed on the left and right spokes 103. By performing a gesture to slide the left and right fingers in contact with the touchpads 12 vertically, the driver can raise or lower the playback volume. Also, by a gesture to flick the left and right fingers in contact with the touchpads 12, the driver can change the track being played back.

For example by a gesture to slide the driver's left and right fingers or by a gesture to flick the left and right fingers, the controller 20 can perform control for the driver to select among a plurality of functions provided in the controlled apparatus 30.

The gestures performed by the driver are not limited to the gestures described above with reference to FIGS. 4 through 9C. The driver can use the touchpads 12 to perform any gesture to cause the controller 20 to execute predetermined control.

Figure 14:
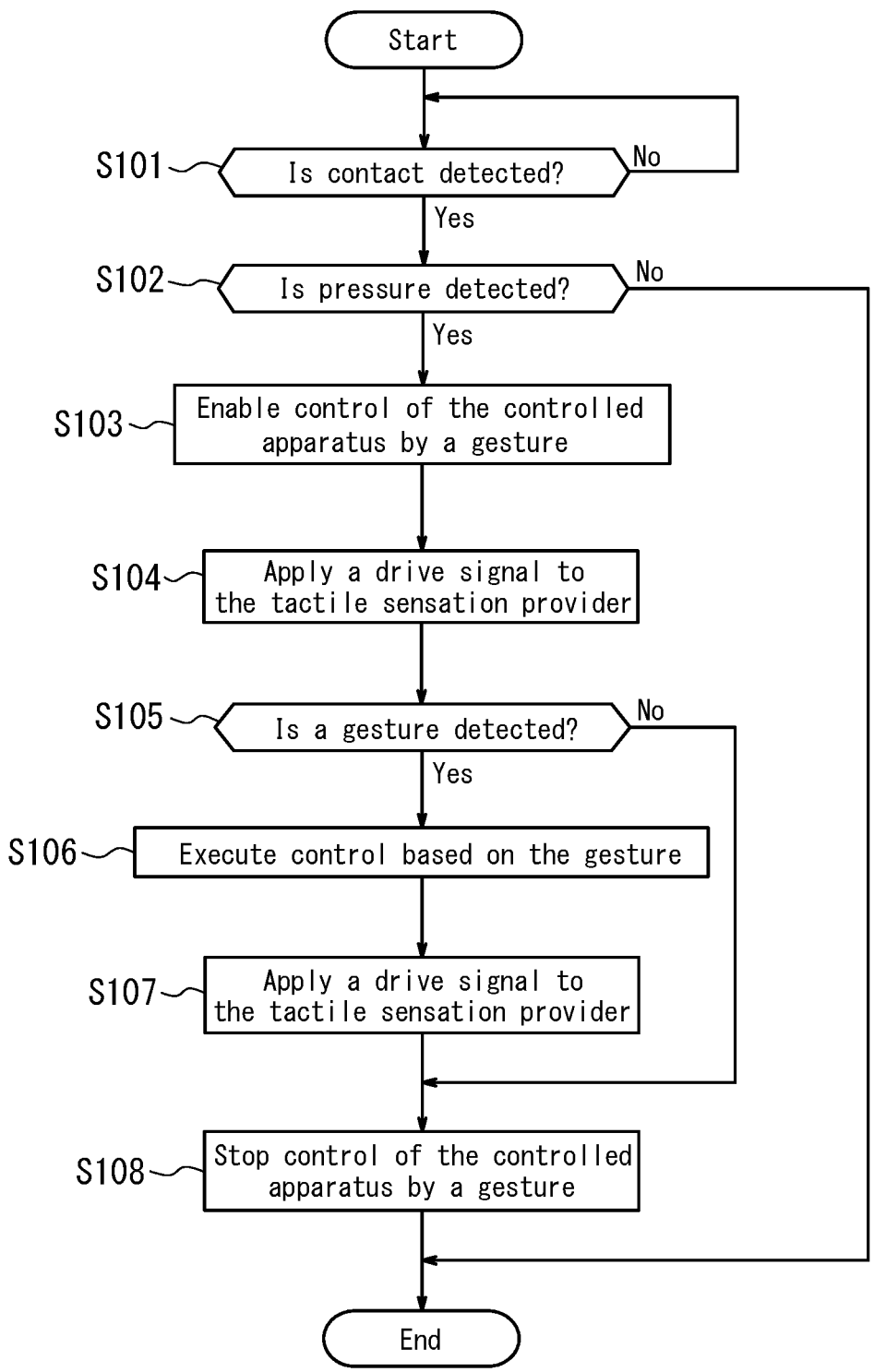
FIG. 14 is a flowchart illustrating an example of processing in the vehicle of FIG. 1.

Next, processing in the vehicle 1 is described. FIG. 14 is a flowchart illustrating an example of processing in the vehicle 1 illustrated in FIG. 1.

First, based on a signal (information related to contact) from the touchpad 12, the controller 20 of the vehicle 1 determines whether contact on the touchpad 12 has been detected (step S101).

When determining that contact has not been detected on the touchpad 12 (step S101: No), the controller 20 repeats step S101 until determining that contact has been detected on the touchpad 12.

When determining that contact has been detected on the touchpad 12 (step S101: Yes), the controller 20 determines whether pressure by the driver's finger or the like on the touchpad 12 has been detected based on a signal (information related to pressure) from the pressure detector 14 (step S102).

When determining that pressure has been detected on the touchpad 12 (step S102: Yes), the controller 20 initiates a state enabling control of the controlled apparatus 30 by a gesture on the touchpad 12 (step S103). In other words, the controller 20 enters a state in which control of the controlled apparatus 30 by a gesture on the touchpad 12 is enabled.

The control 20 applies a drive signal to the tactile sensation provider 13 to indicate that a gesture on the touchpad 12 has been input (step S104). The tactile sensation provider 13 to which the drive signal was applied vibrates based on the drive signal. By sensing the vibration with the finger, the driver can confirm the start of the state in which control of the controlled apparatus 30 by a gesture on the touchpad 12 is enabled.

Next, based on a signal from the touchpad(s) 12 and the pressure detector(s) 14, the controller 20 determines whether a gesture by the driver's finger(s) or the like on the touchpad(s) 12 has been detected (step S105).

When determining that a gesture on the touchpad(s) 12 has been detected (step S105: Yes), the controller 20 executes control based on the gesture (step S106). In other words, the controller 20 controls the controlled apparatus 30 in accordance with the gesture.

The control 20 applies a drive signal to the tactile sensation provider(s) 13 to indicate that a gesture on the touchpad(s) 12 has been input (step S107). Each tactile sensation provider 13 to which the drive signal was applied vibrates based on the drive signal. By sensing the vibration with the finger, the driver can confirm that control based on a gesture was performed.

When the driver's finger separates from the touchpad 12, the controller 20 stops control of the controlled apparatus 30 by a gesture (step S108). When control of a controlled apparatus 30 by a gesture has been stopped, the controller 20 does not execute control based on a gesture even if the driver performs a gesture on the touchpad 12 until control of the controlled apparatus 30 by a gesture is enabled again.

When the controller 20 determines that a gesture on the touchpad 12 has not been detected in step S105 (step S105: No), the processing flow transitions to step S108.

Upon the controller 20 determining in step S102 that pressure has not been detected on the touchpad 12 (step S102: No), the processing flow terminates.

Upon termination of the processing flow, the controller 20 may repeat execution of the processing flow.

In this way, upon detecting pressure by the driver on the touchpad 12 provided in the steering wheel 11, the vehicle 1 according to this embodiment enables control of the controlled apparatus 30 by a gesture on the touchpad(s) 12. Therefore, even if the driver for example contacts the touchpad 12 unintentionally while maneuvering the steering wheel, control not intended by the driver is not executed while not in the state in which control of the controlled apparatus 30 by a gesture on the touchpad 12 is enabled. Therefore, the vehicle 1 according to this embodiment makes it more difficult to perform operations not intended by the driver.

In the vehicle 1 according to this embodiment, when a gesture is input to the touchpad 12, the tactile sensation provider 13 provides a sense of touch in accordance with the gesture on the touchpad 12. Therefore, the driver can confirm, by tactile sensation, whether the pressure or gesture on the touchpad 12 was input, without visual confirmation. With the driver wishes to confirm whether processing based on the operation has been executed, the driver may unconsciously confirm execution visually. The vehicle 1 according to this embodiment, however, makes it easier to reduce such unconscious visual confirmation. As a result, the vehicle 1 according to this embodiment can improve safety as compared to a conventional vehicle.

Embodiment 2

Figure 15:
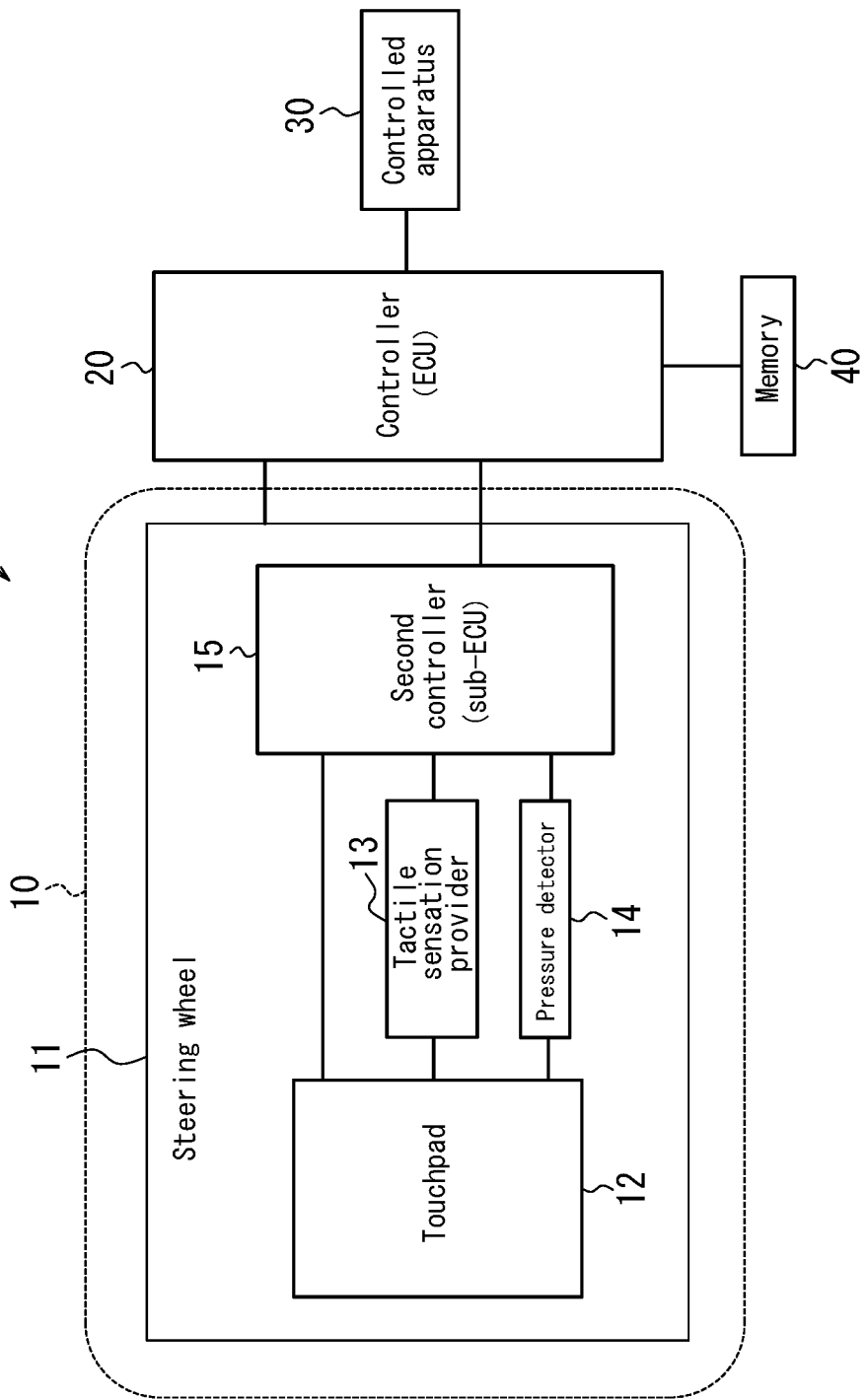
FIG. 15 is a functional block diagram schematically illustrating the configuration of a vehicle according to Embodiment 2.

FIG. 15 is a functional block diagram schematically illustrating the configuration of a vehicle 1 according to Embodiment 2. As in Embodiment 1, the vehicle 1 is provided with a steering wheel 11, a controller (first controller) 20, a controlled apparatus 30, and a memory 40. The following describes the differences from Embodiment 1, omitting a description of common features.

In Embodiment 2, the steering wheel 11 is provided with a second controller 15 in addition to the touchpad 12, the tactile sensation provider 13, and the pressure detector 14. The second controller 15 detects pressure and gesture operations that the driver performs on the touchpad 12 and functions as a sub-ECU that applies a drive signal to the tactile sensation provider 13. Upon detecting pressure and a gesture operation on the touchpad 12, the second controller 15 transmits the detected operation to the first controller 20, which is the main ECU. The first controller 20 executes control of the controlled apparatus 30 based on pressure and gesture operations on the touchpad 12.

The second controller 15 applies a drive signal to the tactile sensation provider 13 in accordance with the detected pressure or gesture operation on the touchpad 12. Therefore, by sensing the vibration of the tactile sensation provider 13 to which the drive signal is applied, the driver can confirm that a gesture on the touchpad 12 has been input via vibration transmitted to the finger, without visual confirmation. In this way, processing related to the touchpad 12 can be executed in this embodiment by the second controller 15, which is the sub-ECU.

Embodiment 3

Figure 16:
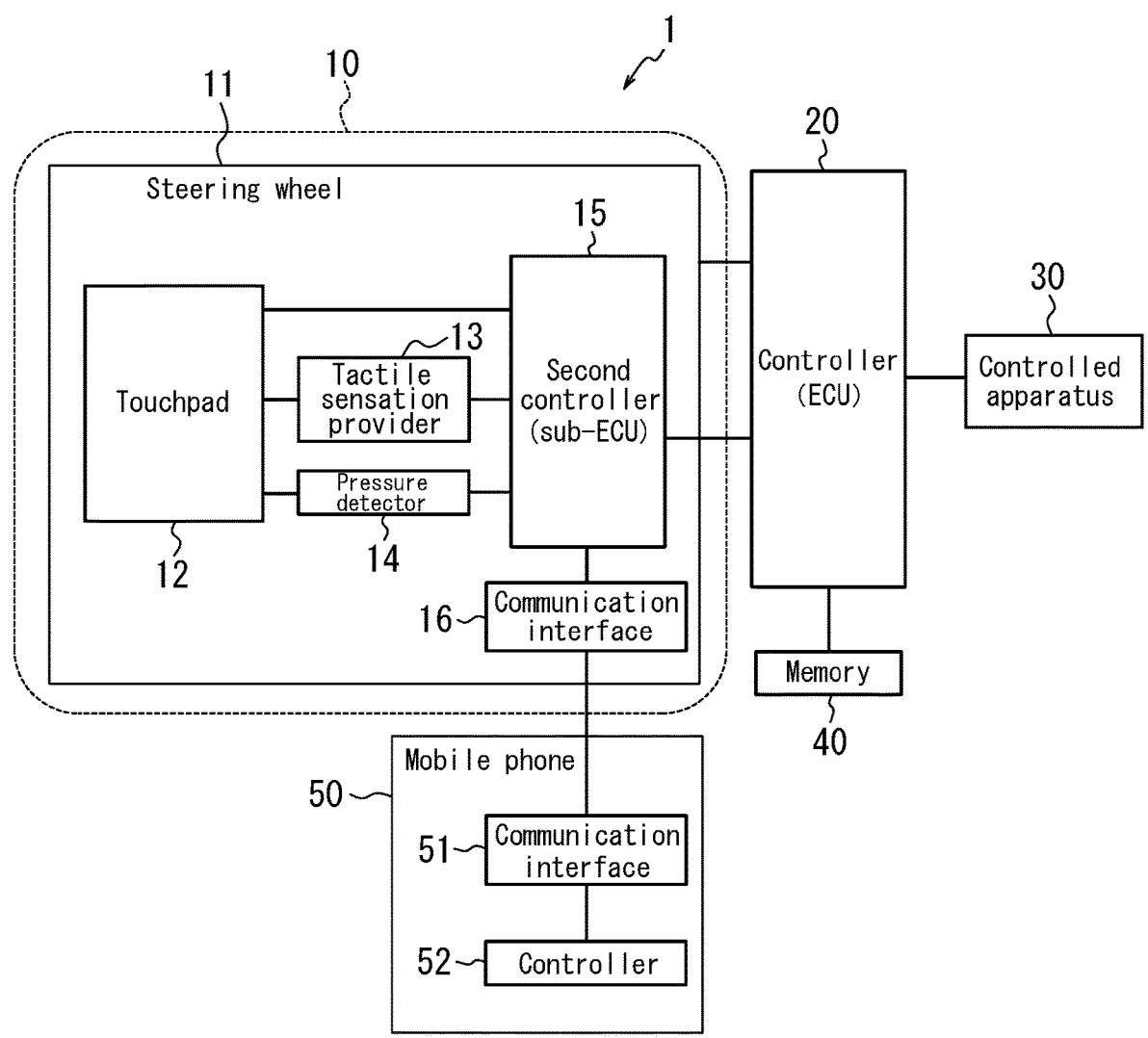
FIG. 16 is a functional block diagram schematically illustrating the configuration of a vehicle according to Embodiment 3.

FIG. 16 is a functional block diagram schematically illustrating the configuration of a vehicle 1 according to Embodiment 3. The vehicle 1 is provided with a steering wheel 11, a controller (first controller) 20, a controlled apparatus 30, a memory 40, and a mobile phone 50. The mobile phone 50 is an example of a controlled apparatus 30 used in relation to the vehicle 1, but the mobile phone 50 in Embodiment 3 is not connected directly to the first controller 20. The following describes the differences from Embodiment 1, omitting a description of common features.

In Embodiment 3, the steering wheel 11 is provided with a second controller 15 and a communication interface 16 in addition to the touchpad 12, the tactile sensation provider 13, and the pressure detector 14. The second controller 15 detects pressure and gesture operations that the driver performs on the touchpad 12 and functions as a sub-ECU that applies a drive signal to the tactile sensation provider 13. The communication interface 16 communicates with the mobile phone 50, which is an external device, via a wireless connection such as Bluetooth® (Bluetooth is a registered trademark in Japan, other countries, or both). Upon detecting pressure and a gesture operation on the touchpad 12, the second controller 15 transmits a signal related to the detected operation to the mobile phone 50 from the communication interface 16.

The mobile phone 50 is provided with a communication interface 51 and a controller 52. In the mobile phone 50, the communication interface 51 receives a signal related to an operation from the steering wheel 11, and the controller 52 controls the mobile phone 50 based on the signal. The controller 52 for example launches an executable application on the mobile phone 50.

In this way, by connecting a particular external device to the steering wheel 11, the driver can operate not only the controlled apparatus 30 mounted in the vehicle 1, but also an apparatus (external device) used in relation to the vehicle 1.

The present disclosure is not limited to the above embodiments, and a variety of modifications and changes are possible. For example, the functions and the like included in the various components and steps may be reordered in any logically consistent way. Furthermore, components or steps may be combined into one or divided.

For example, in Embodiment 1, the controller 20 has been described as stopping control of the controlled apparatus 30 by a gesture on the touchpad 12 upon detecting release of a finger from the touchpad 12. The stopping of control of the controlled apparatus 30 by a gesture on the touchpad 12 is not, however, limited to this example. For example, the controller 20 may stop control of the controlled apparatus 30 by a gesture of the touchpad 12 when pressure on the touchpad 12 falls below the first pressure. In other words, the controller 20 maintains the state in which control of the controlled apparatus 30 by a gesture on the touchpad 12 is enabled only while the touchpad 12 is receiving pressure equal to or greater than the first pressure. In this case, the driver performs a gesture while applying pressure to the touchpad 12.

Also, the driver may perform the slide and flick gestures described with reference to FIG. 8 and FIGS. 9A to 9C with either the left or right finger.

The invention claimed is:

1. A vehicle comprising:
   a steering wheel; and
   a touchpad disposed on the steering wheel and including a first touchpad and a second touchpad,
   wherein upon detecting a first pressure on the first and second touchpads of the steering wheel, the vehicle initiates a state enabling control of a controlled apparatus and provides a first tactile sensation from the first and second touchpads to confirm a start of the state enabling the control of the controlled apparatus,
   wherein upon detecting a gesture on the touchpad of the steering wheel while in the state of the enabled control of the controlled apparatus, the vehicle provides a second tactile sensation from the touchpad in accordance with the gesture on the touchpad of the steering wheel,
   wherein after enabling the control of the controlled apparatus, the vehicle returns to a state of not receiving the control of the controlled apparatus either upon detecting release from the touchpad of a contacting object in contact with the touchpad or upon detecting that pressure on the touchpad falls below the first pressure, and
   wherein the vehicle detects, as the gesture, either a second pressure that is higher than the first pressure on both of the first and second touchpads at approximately the same time or a third pressure that is higher than the first pressure on only one of the first and second touchpads while in the state of the enabled control of the controlled apparatus, and upon detecting the gesture, the vehicle executes, as control of the controlled apparatus associated with the gesture, different control between in a case of detecting the second pressure on both of the first and second touchpads at approximately the same time and in a case of detecting the third pressure on only the one of the first and second touchpads.

2. The vehicle of claim 1, wherein the vehicle provides different tactile sensations in accordance with the gesture on the touchpad of the steering wheel.

3. The vehicle of claim 1, wherein
   in the case of detecting the second pressure on both of the first and second touchpads at approximately the same time, the vehicle executes, as the control of the controlled apparatus a function to monitor surroundings of the vehicle by which an image of the surroundings is displayed on a display, and
   in the case of detecting the third pressure on only the one of the first and second touchpads, the vehicle executes, as the control of the controlled apparatus a mode in which a type of image, being the image of the surroundings, selected according to pressed one of the first and second touchpads is displayed on the display.

4. A vehicle comprising:
   a steering wheel;
   a touchpad disposed on the steering wheel and including a first touchpad and a second touchpad; and
   a main Electric Control Unit or Engine Control Unit (ECU) executing control of the vehicle,
   wherein the main ECU
      upon detecting a first pressure on the first and second touchpads of the steering wheel, initiates a state enabling control of a controlled apparatus and provides a first tactile sensation from the first and second touchpads to confirm a start of the state enabling the control of the controlled apparatus; and
      upon detecting a gesture on the touchpad of the steering wheel while in the state of the enabled control of the controlled apparatus, provides a second tactile sensation from the touchpad in accordance with the gesture on the touchpad of the steering wheel,
   wherein after enabling the control of the controlled apparatus, the main ECU returns to a state of not receiving the control of the controlled apparatus either upon detecting release from the touchpad of a contacting object in contact with the touchpad or upon detecting that pressure on the touchpad falls below the first pressure, and
   wherein the main ECU detects, as the gesture, either a second pressure that is higher than the first pressure on both of the first and second touchpads at approximately the same time or a third pressure that is higher than the first pressure on only one of the first and second touchpads while in the state of the enabled control of the controlled apparatus, and upon detecting the gesture, the main ECU executes, as control of the controlled apparatus associated with the gesture, different control between in a case of detecting the second pressure on both of the first and second touchpads at approximately the same time and in a case of detecting the third pressure on only the one of the first and second touchpads.

5. The vehicle of claim 4, wherein
in the case of detecting the second pressure on both of the first and second touchpads at approximately the same time, the main ECU executes, as the control of the controlled apparatus a function to monitor surroundings of the vehicle by which an image of the surroundings is displayed on a display, and
in the case of detecting the third pressure on only the one of the first and second touchpads, the main ECU executes, as the control of the controlled apparatus a mode in which a type of image, being the image of the surroundings, selected according to pressed one of the first and second touchpads is displayed on the display.

6. A steering unit comprising:
a steering wheel; and
a touchpad disposed on the steering wheel and including a first touchpad and a second touchpad,
wherein upon detecting a first pressure on the first and second touchpads of the steering wheel, the steering unit initiates a state enabling control of a controlled apparatus and provides a first tactile sensation from the first and second touchpads to confirm a start of the state enabling the control of the controlled apparatus,
wherein upon detecting a gesture on the touchpad of the steering wheel while in the state of the enabled control of the controlled apparatus, the steering unit provides a second tactile sensation from the touchpad in accordance with the gesture on the touchpad of the steering wheel,
wherein after enabling the control of the controlled apparatus, the steering unit returns to a state of not receiving the control of the controlled apparatus either upon detecting release from the touchpad of a contacting object in contact with the touchpad or upon detecting that pressure on the touchpad falls below the first pressure, and
wherein the steering unit detects, as the gesture, either a second pressure that is higher than the first pressure on both of the first and second touchpads at approximately the same time or a third pressure that is higher than the first pressure on only one of the first and second touchpads while in the state of the enabled control of the controlled apparatus, and upon detecting the gesture, the steering unit executes, as control of the controlled apparatus associated with the gesture, different control between in a case of detecting the second pressure on both of the first and second touchpads at approximately the same time and in a case of detecting the third pressure on only the one of the first and second touchpads.

7. The steering unit of claim 6, wherein the steering unit is provided in a vehicle, wherein
in the case of detecting the second pressure on both of the first and second touchpads at approximately the same time, the steering unit executes, as the control of the controlled apparatus a function to monitor surroundings of the vehicle by which an image of the surroundings is displayed on a display, and
in the case of detecting the third pressure on only the one of the first and second touchpads, the steering unit executes, as the control of the controlled apparatus a mode in which a type of image, being the image of the surroundings, selected according to pressed one of the first and second touchpads is displayed on the display.

* * * * *